(12) United States Patent
Laycock

(10) Patent No.: US 6,811,305 B2
(45) Date of Patent: Nov. 2, 2004

(54) FOOD COOLING COMPLIANCE DATA LOGGER

(75) Inventor: James Andrew Laycock, Auckland (NZ)

(73) Assignee: Escort Data Logging Systems Ltd., Auckland (NZ)

( * ) Notice: Subject to any disclaimer, the term of this patent is extended or adjusted under 35 U.S.C. 154(b) by 0 days.

(21) Appl. No.: 10/367,703

(22) Filed: Feb. 19, 2003

(65) Prior Publication Data
US 2004/0161016 A1 Aug. 19, 2004

(51) Int. Cl.⁷ ............................. G01K 3/04; G01K 1/02
(52) U.S. Cl. .................. 374/102; 340/286.09; 702/187
(58) Field of Search ................... 374/102–106; 428/88; 340/588, 589, 286.09; 702/187

(56) References Cited

U.S. PATENT DOCUMENTS

| | | | | |
|---|---|---|---|---|
| 2,741,099 A | * | 4/1956 | Beane | 374/104 |
| 2,762,711 A | * | 9/1956 | Zopf, Jr. | 426/88 |
| 4,771,791 A | * | 9/1988 | Kubouchi | 374/102 |
| 4,844,622 A | * | 7/1989 | Weiss | 374/102 |
| 4,933,525 A | * | 6/1990 | St. Phillips | 426/88 |
| 5,249,863 A | * | 10/1993 | Brown | 374/102 |
| 5,437,163 A | | 8/1995 | Jurewicz et al. | 702/187 |
| 5,939,974 A | | 8/1999 | Heagle et al. | 340/286.09 |
| 6,320,512 B1 | * | 11/2001 | Nicholson et al. | 340/589 |
| 6,549,135 B2 | * | 4/2003 | Singh et al. | 340/588 |

* cited by examiner

Primary Examiner—G. Bradley Bennett
(74) Attorney, Agent, or Firm—Young & Thompson

(57) ABSTRACT

A data logger records a time/temperature profile for the preparation and cooling of a prepared food by recording only those timed points specified on a specific food preparation protocol. Typically the protocol may be that specified by the FDA and the logger may record the occurrence of a temperature exceeding a required minimum, and the subsequent occurrence of one or more temperatures at specified elapsed times.

15 Claims, 2 Drawing Sheets

FOOD COOLING COMPLIANCE DATA LOGGER

FIELD OF THE INVENTION

This invention relates to a data logger capable of verifying compliance with the cooling regime recommended by the US Department of Agriculture Food and Safety Inspection Service for cooked meat as approved by the Food and Drugs Administration.

BACKGROUND

Cooked food is required to be cooled within set times to avoid the establishment of organisms at a level above that which could be dangerous for consumption. One version of these levels is set by the US Department of Agriculture and requires:

3-501.14 Cooling (A) Cooked POTENTIALLY HAZARDOUS FOOD shall be cooled:
  (1) Within 2 hours from 60° C. (140° F.) to 21° C. (70° F.); and
  (2) Within 6 hours from 60° C. (140° F.) to 5° C. (41° F.) or less, or to 7° C. (45° F.) or less as specified under ¶3-501.16(A)(2)(b).
(B) POTENTIALLY HAZARDOUS FOOD shall be cooled within 4 hours to 5° C. (41° F.) or less, or to 7° C. (45° F.) as specified under ¶3-501.16(A)(2)(b) if prepared from ingredients at ambient temperature, such as reconstituted FOODS and canned tuna.
(C) Except as specified in ¶(D) of this section, a POTENTIALLY HAZARDOUS FOOD received in compliance with LAWS allowing a temperature above 5° C. (41° F.) during shipment from the supplier as specified in ¶3-202.11(B), shall be cooled within 4 hours to 5° C. (41° F.) or less, or 7° C. (45° F.) or less as specified under ¶3-501.16(A)(2)(b).

PRIOR ART

Data loggers exist for a variety of tasks including the recording of the temperature. Application of these to the food industry is shown by:

U.S. Pat. No. 5,939,974 which describes a system for monitoring and controlling food service requirements in a food service establishment. It includes a main computer with appropriate peripherals and an interface unit. The interface unit is connected to the main computer and is also connected to a plurality of monitoring devices, some of which monitor essential food establishment functions, such as temperatures, motion detectors, sanitary areas and the like, while others monitor employee activities. The interface unit is also connected to a plurality of control devices which both monitor and control essential activities, including sanitation, temperature, signals for smoke detection, pH levels, inventory and employee activities. Portable instruments are included with connection capabilities to the interface unit, and employee identification devices are also included.

U.S. Pat. No. 5,437,163 which relates to a method of logging data relative to the operation of a transport refrigeration unit, during each trip of the transport refrigeration unit, with the transport refrigeration unit including control means and non-volatile memory means. The method includes the steps of monitoring a plurality of predetermined variables of the transport refrigeration unit to provide data, and selecting those variables of the plurality of monitored variables whose data is to be logged in the memory means during a trip of the transport refrigeration unit.

Such data loggers do not relate to the specific task of monitoring food cool down time, which has specific requirements to be followed.

OBJECT

It is an object of this invention to provide a data logger which will monitor compliance with a cooling regime as specified, or which will at least provide the public with a useful choice.

STATEMENT OF INVENTION

In one aspect, the invention comprises a data logger, a temperature probe fitted to the data logger and a logging regime which monitors the temperature of the probe environment at intervals which will indicate compliance or non-compliance with a specified cooling regime.

DRAWINGS

PREFERRED EMBODIMENTS

FIG. 1

Figure 1:
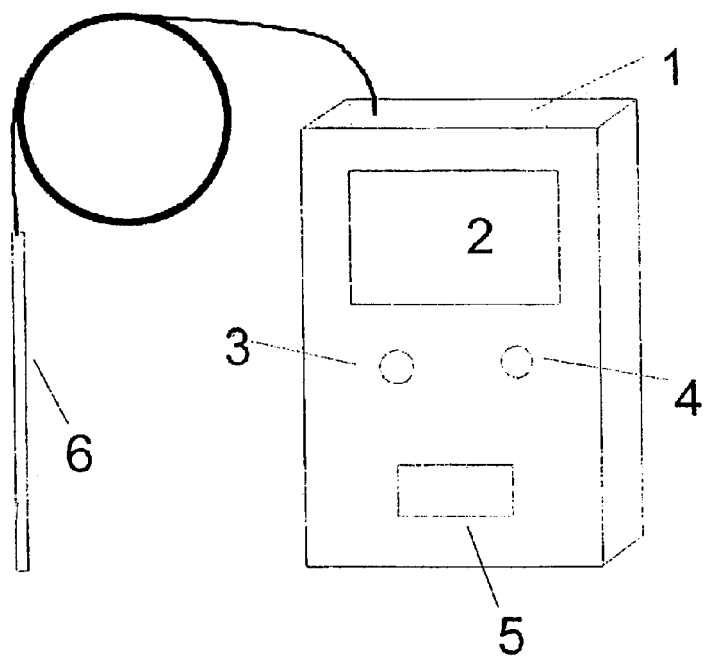
FIG. 1 is a perspective view of a data logger in accordance with the invention
Figure 2:
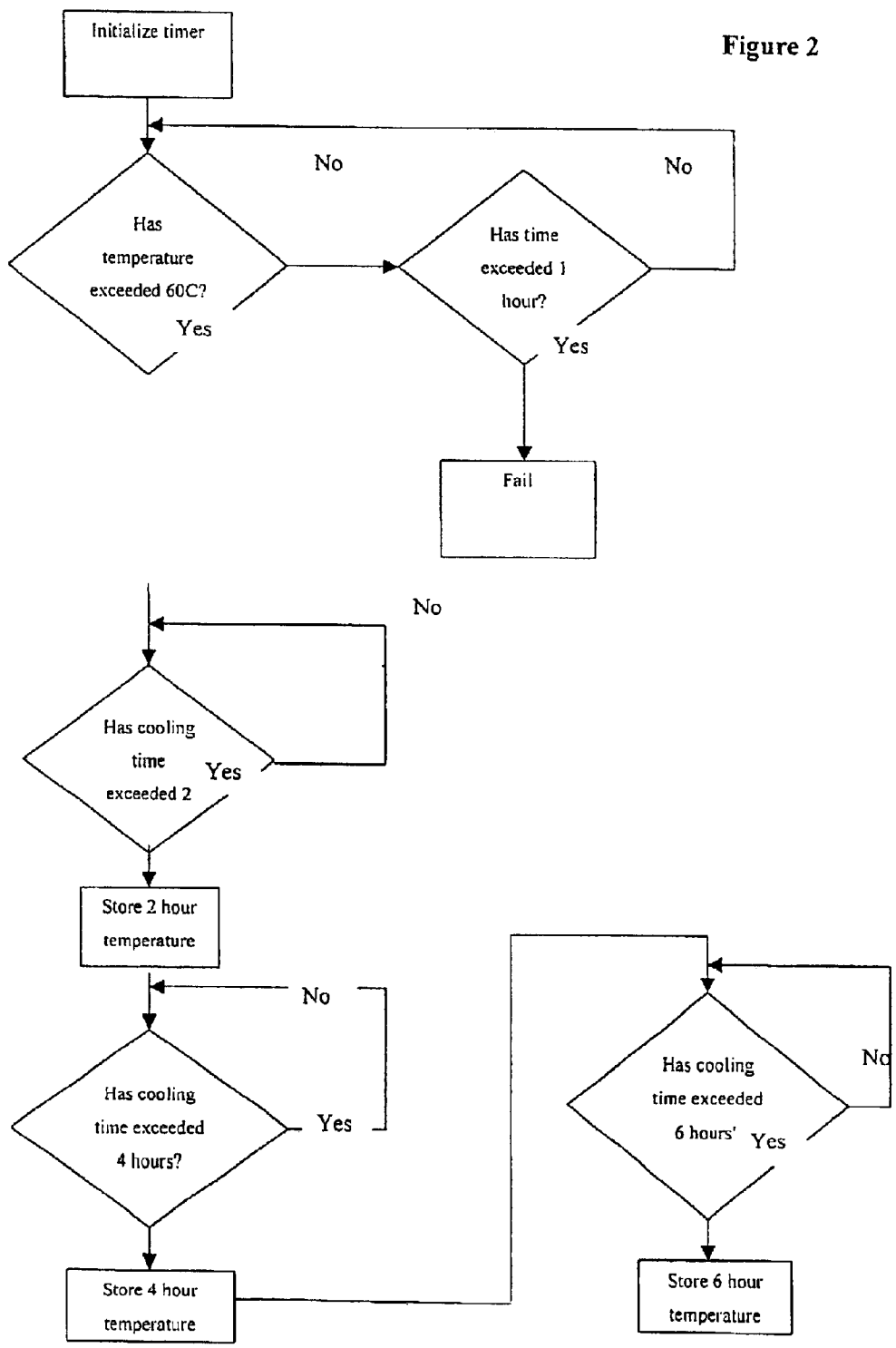
FIG. 2 is a flow chart of a logging regime which would indicate compliance with the current US FDA recommendations.

Shows a data logger 1 having a display 2, status indicating LEDs 3 and 4, a control switch 5 and a temperature probe 6. The logger has an internal clock and can store date and time information against temperature information from the probe. In use the probe 6 is located in the area of food which has just been cooked and the control switch 5 is operated. The logger initializes and commences displaying the temperature and the current date and time.

The control switch may be a magnetically operated switch so that there are no external switches or control knobs or it may be a press button switch. The logger may not be resettable once started until a full monitoring period has elapsed to avoid inadvertent restarting of a monitored cooling period.

LED 3 indicates that the logger has been initialised and is functioning and LED 4 will show an alarm state if the regime has not been complied with.

FIG. 2

Is a flow chart for the logic embedded in the logger, implementing the requirements below.

It is a requirement that the food being monitored must exceed 60° C. in order for harmful organisms to be destroyed. If the temperature probe does not reach this temperature within one hour of activation the logger will indicate a failure.

Within 6 hours of first indicating a temperature of 60° C. the temperature should have dropped below 40° C., and accordingly the logger holds and displays the temperature at 2 hour intervals until 6 hours has elapsed, at which logging ceases.

The logged temperatures and times may be read out via an output port and permanently recorded.

ADVANTAGES OF THE PREFERRED EMBODIMENT

The logger as described monitors only one location and is capable only of showing compliance with one regime. This means that a user does not have a complex choice of regimes to make, and that the logger cannot accidentally be forced into different modes of operation. This adds to the reliability of the logger when in use since its intended use is in the food industry where it acts as a single use tool.

VARIATIONS

Preferably the internally held regime may be varied by reprogramming the logger.

What is claimed is:

1. A regulatory compliance data logger capable of recording temperature at a desired location and indicating compliance with a specified time/temperature cooling regime, comprising:

means for storing data corresponding to defined regulatory time/temperature regimes;

means for sensing temperature;

means for detecting a first target temperature;

means for recording a series of temperatures;

timing means adapted to allow the recording of temperature information from the sensing means at predefined intervals/instants which match time intervals of the stored data;

means for starting the timing means; and means for locking out user interference until after completion of the specified time regime.

2. A regulatory compliance data logger as claimed in claim 1, wherein the means for sensing temperature is a probe capable of being inserted into the food to be monitored.

3. A regulatory compliance data logger as claimed in claim 2, wherein the means for locking out user interference includes a timer which prevents further inputs from the starting means, until the timer has completed a pre-set program.

4. A method of recording temperature at a desired location in a data logger and indicating compliance with a specific time/temperature cooling regime wherein the location is a food preparation area and after initialization, the data logger monitors the attainment of a first target temperature and thereafter monitors and records the temperature at the desired location at only specified time instants and cannot be reinitialized before expiration of the regime.

5. A method as claimed in claim 4, wherein the logger records attainment of a first higher temperature, followed by monitoring and recording a second temperature a specified time from attainment of the higher temperature, and a third temperature a further specified time from said second time.

6. A method as claimed in claim 5, wherein the logger also records a fourth temperature at a further specified time from said third time.

7. A method as claimed in claim 5, wherein the cooling regime is that required by the US Food and Drug Administration guidelines for cooked meat.

8. A method as claimed in claim 4, wherein the data indicating compliance or non-compliance with the cooling regime may be output from the logger for permanent storage.

9. A method as claimed in claim 4, wherein the logger is environmentally sealed to allow cleaning according to approved hygienic methods.

10. A method as claimed in claim 4, wherein the logger carries internally criteria for recording in accordance with only a single cooling regime.

11. A method as claimed in claim 9, wherein the logger is externally reprogrammable to a different cooling regime.

12. A data logger comprising:

a temperature sensing device; and a control switch connected to said temperature sensing device that only initiates a timing sequence of a cooling regime, wherein said timing sequence can only be stopped upon completion of said timing sequence, and wherein said data logger continually monitors time, but records a temperature only at specified timed instants.

13. The data logger as claimed in claim 12, wherein the logger records a first temperature at a first specified time and then records a second temperature at a second specified time, said second temperature being lower than said first temperature.

14. The data logger as claimed in claim 12 wherein the logger is programmable for only a single cooling regime at a time.

15. The data logger as claimed in claim 14, wherein the logger is externally reprogrammable to a different cooling regime.

* * * * *